United States Patent
Akama et al.

(10) Patent No.: US 11,209,771 B2
(45) Date of Patent: Dec. 28, 2021

(54) IMAGE FORMING APPARATUS

(71) Applicants: Shiro Akama, Tokyo (JP); Tsuyoshi Endo, Kanagawa (JP); Tatsuya Suzuki, Kanagawa (JP)

(72) Inventors: Shiro Akama, Tokyo (JP); Tsuyoshi Endo, Kanagawa (JP); Tatsuya Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/062,844

(22) Filed: Oct. 5, 2020

(65) Prior Publication Data

US 2021/0103247 A1    Apr. 8, 2021

(30) Foreign Application Priority Data

Oct. 7, 2019  (JP) .............................. JP2019-184565

(51) Int. Cl.
*G03G 15/00*  (2006.01)
*G03G 21/16*  (2006.01)

(52) U.S. Cl.
CPC ..... *G03G 21/1633* (2013.01); *G03G 15/6502* (2013.01); *G03G 21/1647* (2013.01)

(58) Field of Classification Search
CPC ........... G03G 15/6502; G03G 21/1633; G03G 21/1638; G03G 21/1642; G03G 21/1647; G03G 21/1661
See application file for complete search history.

(56) References Cited

U.S. PATENT DOCUMENTS

| | | |
|---|---|---|
| 2009/0060612 A1 | 3/2009 | Kohara et al. |
| 2014/0167580 A1 | 6/2014 | Funayama et al. |
| 2014/0167587 A1 | 6/2014 | Takenaka et al. |
| 2014/0169828 A1 | 6/2014 | Ohta et al. |
| 2014/0248066 A1 | 9/2014 | Akiyama et al. |
| 2015/0098723 A1* | 4/2015 | Mitorida ............ G03G 21/1685 399/92 |
| 2019/0286047 A1 | 9/2019 | Ishimitsu et al. |

FOREIGN PATENT DOCUMENTS

| | | |
|---|---|---|
| JP | 4-195313 | 7/1992 |
| JP | 6-239476 | 8/1994 |
| JP | 2018-109698 | 7/2018 |
| JP | 2018-124343 | 8/2018 |

* cited by examiner

*Primary Examiner* — Hoang X Ngo
(74) *Attorney, Agent, or Firm* — Harness, Dickey & Pierce, P.L.C.

(57) ABSTRACT

An image forming apparatus includes an image forming device, a sheet feeder, and a housing. The image forming device forms an image on a recording medium. The sheet feeder stores the recording medium and conveys the recording medium toward the image forming device. The housing accommodates an electrical device in the housing. The housing includes a housing body and a drawer that is drawn out from the housing body. The drawer includes a bottom plate on which the electrical device is placeable and a partition above the bottom plate on which the electrical device is placeable.

18 Claims, 4 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2019-184565, filed on Oct. 7, 2019, in the Japan Patent Office, the entire disclosure of which is hereby incorporated by reference herein.

BACKGROUND

Technical Field

Embodiments of the present disclosure relate to an image forming apparatus.

Description of the Related Art

In an image forming apparatus, there is known a configuration capable of accommodating a network device connected to an apparatus body of the image forming apparatus.

SUMMARY

In an aspect of the present disclosure, an image forming apparatus includes an image forming device, a sheet feeder, and a housing. The image forming device forms an image on a recording medium. The sheet feeder stores the recording medium and conveys the recording medium toward the image forming device. The housing accommodates an electrical device in the housing. The housing includes a housing body and a drawer that is drawn out from the housing body. The drawer includes a bottom plate on which the electrical device is placeable and a partition above the bottom plate on which the electrical device is placeable.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
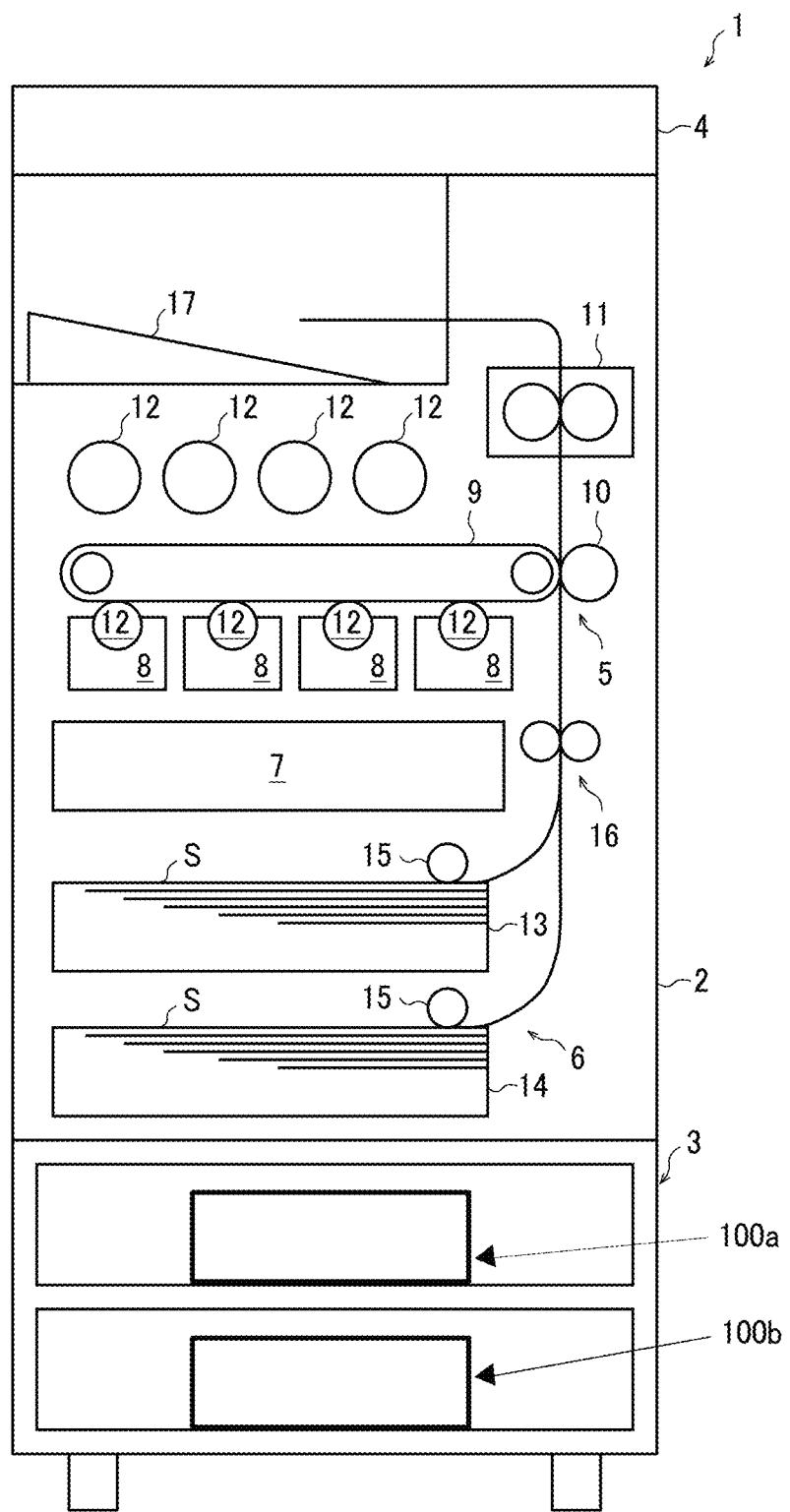
FIG. 1 is a schematic plan view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a plan view of an image forming apparatus according to an embodiment of the present disclosure. In FIG. 1, an image forming apparatus 1, which is a full-color copying apparatus according to the present embodiment, includes an apparatus body 2 and a housing 3. The housing 3 is disposed below the apparatus body 2 and houses electrical devices such as network devices.

An image reading unit 4, an image forming device 5, a sheet feeder 6, and the like are disposed inside the apparatus body 2. The image reading unit 4 reads an image. The image forming device 5 forms an image. The sheet feeder 6 feeds sheets.

The image reading unit 4 includes an exposure glass, a scanning optical system, a condenser lens, an image sensor, and the like. The image reading unit 4 has a known configuration in which an image of a document placed on the exposure glass is scanned by the scanning optical system, condensed by the condenser lens, and then formed on the image sensor to obtain the image.

The image forming device 5 includes an exposure device 7, a plurality of process cartridges 8, an intermediate transfer belt 9, a secondary transfer roller 10, a fixing device 11, and the like.

The exposure device 7 irradiates surfaces of photoconductor drums, which are described later, with laser light based on the image data read by the image reading unit 4, and forms electrostatic latent images based on the image data on the uniformly charged surfaces of the photoconductor drums.

The four process cartridges 8 are provided corresponding to four colors of yellow, magenta, cyan, and black, respectively. Each of the process cartridges 8 includes a photoconductor drum 12, a charger, a developing device, a cleaner, a discharger, and the like. Each of the process cartridges 8 is detachably attached to the apparatus body 2.

Each of the photoconductor drums 12 is driven by a driver to rotate in a clockwise direction in FIG. 1. The surface of each photoconductor drum 12 is uniformly charged by the charger after being discharged by the discharger, and the charged surface is irradiated with laser light from the exposure device 7 to form an electrostatic latent image. A developer charged with a polarity opposite to a polarity of the electrostatic latent image is supplied from each of the developing devices to the formed electrostatic latent image and the electrostatic latent image is visualized into a toner image. Toner is supplied to each of the developing devices from a corresponding one of toner bottles 24 in accordance with the consumption amount of toner.

Color toner images formed on the surfaces of the photoconductor drums 12 are primarily transferred onto the intermediate transfer belt 9 by the operation of primary transfer rollers disposed to face the corresponding photoconductor drums 12. At this time, the toner images of the respective colors are superimposed one on another, and a full-color toner image in which the toner images of the four colors are superimposed is formed on the intermediate transfer belt 9.

The sheet feeder 6 is disposed below the exposure device 7. The sheet feeder 6 includes a plurality of sheet feeding trays 13 and 14. The sheet feeding trays 13 and 14 accommodate therein transfer sheets S as recording media. Sheet feeding rollers 15 are disposed in vicinities of downstream ends of the sheet feeding trays 13 and 14 in a sheet feeding direction to feed the transfer sheets S one by one.

A registration roller pair 16 is disposed downstream of the sheet feeding rollers 15 in the sheet feeding direction to convey the transfer sheet S fed from each of the sheet feeding trays 13 and 14 to a secondary transfer device disposed further downstream in the sheet feeding direction. After the registration roller pair 16 temporarily stops the fed transfer sheet S, the registration roller pair 16 resumes rotation at a predetermined timing when the full-color toner image on the intermediate transfer belt 9 reaches the secondary transfer device to feed the temporarily stopped transfer sheet S to the secondary transfer device.

The secondary transfer roller 10, which is in contact with the intermediate transfer belt 9 to constitute the secondary transfer device, is disposed downstream of the registration roller pair 16 in a sheet conveyance direction at a position facing the intermediate transfer belt 9 via a sheet conveyance path. The secondary transfer roller 10 applies a bias to the transfer sheet S and secondarily transfers the full-color toner image formed on the intermediate transfer belt 9 onto the transfer sheet S.

The fixing device 11 is disposed downstream of the secondary transfer roller 10 in the sheet conveyance direction. The fixing device 11 includes a heating roller and a pressure roller and fixes the full-color toner image, which has been secondarily transferred onto the transfer sheet S, onto the transfer sheet S by heat and pressure. The transfer sheet S, on which the full-color toner image has been fixed, is ejected and stacked on a sheet ejection tray 17 provided in an upper portion of the apparatus body 2.

Next, the housing 3 as a distinctive feature of the present embodiment is described. The housing 3 is a housing to accommodate electrical devices 100a, 100b such as network devices, specifically, a server, a portable computer device such as a notebook personal computer or a mobile personal computer, or the like. The housing 3 can accommodate the above-described electrical devices 100a, 100b such as the server, the notebook personal computer, and the mobile personal computer both during operation and non-operation, and heat generated from the accommodated electrical devices 100a, 100b acts on the inside of the housing 3 during operation.

Figure 2:
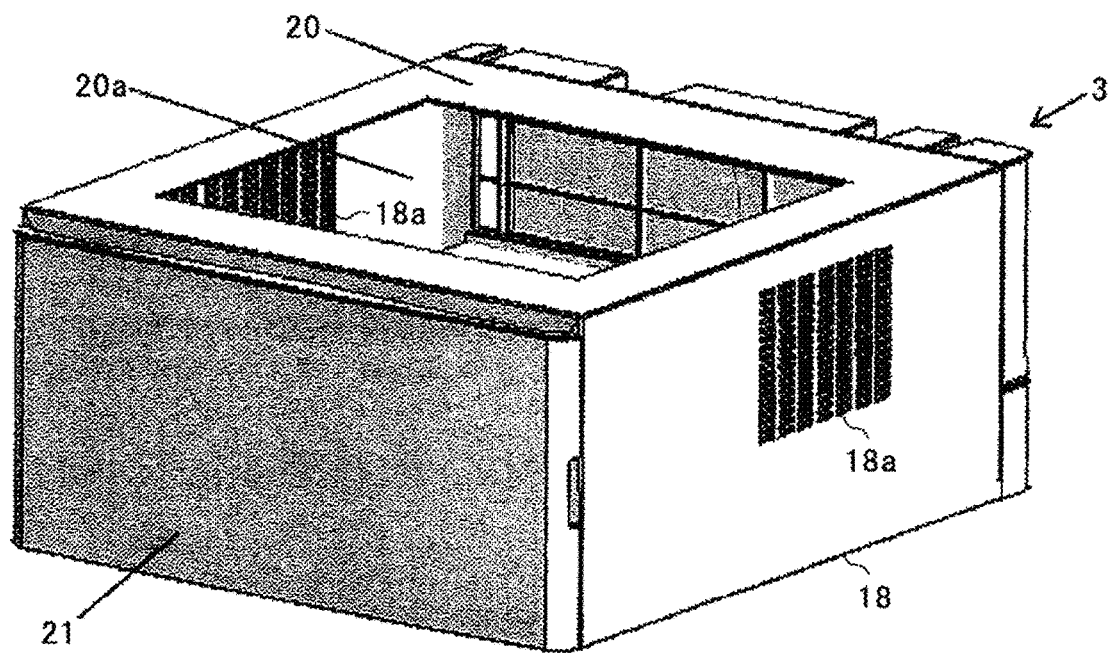
FIG. 2 is a schematic perspective view of a network device housing according to an embodiment of the present disclosure.
Figure 3:
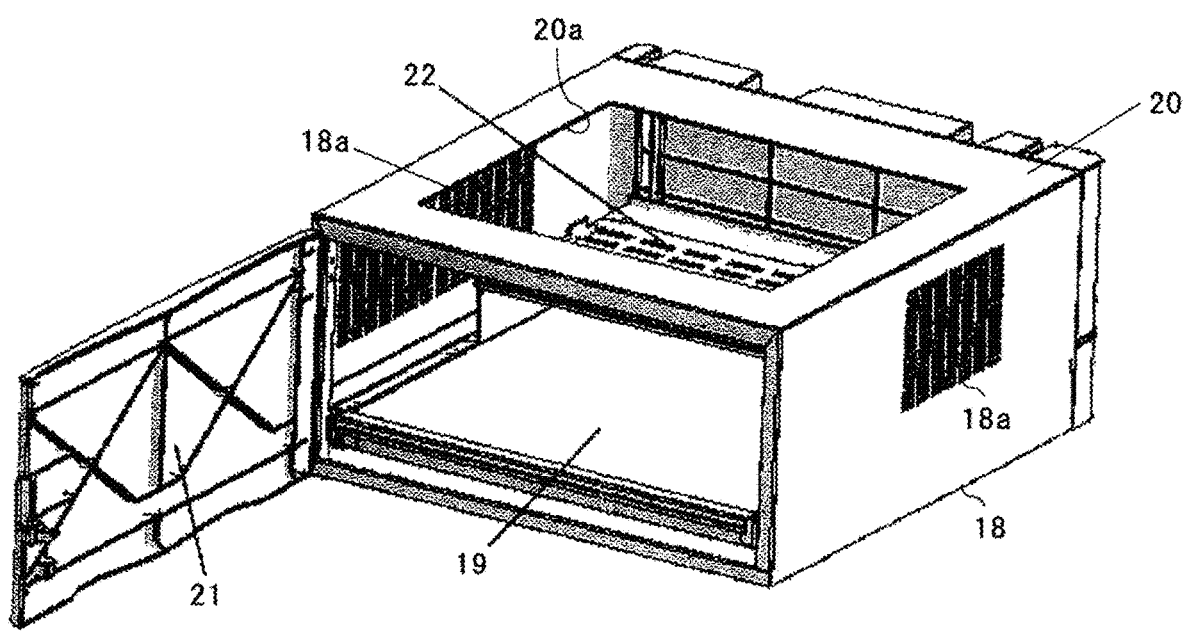
FIG. 3 is a schematic perspective view of a configuration of the network device housing according to an embodiment of the present disclosure.

As illustrated in FIGS. 2 and 3, the housing 3 includes a housing body 18, a bottom plate 19, a top plate 20, a door 21, a partition 22, and the like. The housing body 18 has a housing shape formed of metal plates. An upper side and a front side (a side corresponding to a front side of the image forming apparatus 1) of the housing body 18 are opened.

The door 21 is attached at a front opening of the housing body 18 to be openable and closable. The electrical devices are accommodated into and taken out from the housing 3 in a state which the door 21 is opened. The door 21 is held at the housing body 18 in a closed state by a lock, and can be easily opened from the closed state by an operator's hand.

The top plate 20 having an opening 20a is attached to an upper side opening of the housing body 18. The opening 20a is formed to have a size that allows the electrical devices to be taken in and out of the housing body 18 from above. In other words, the opening 20a is formed to have a size that allows the electrical devices to be replaced, that is, a size that allows the electrical devices and a hand or a jig holding one of the electrical devices, or the like to pass therethrough. Exhaust ports 18a to exhaust heat and air in the housing body 18 outside of the housing body 18 are provided on opposed side walls of the housing body 18.

Figure 4:
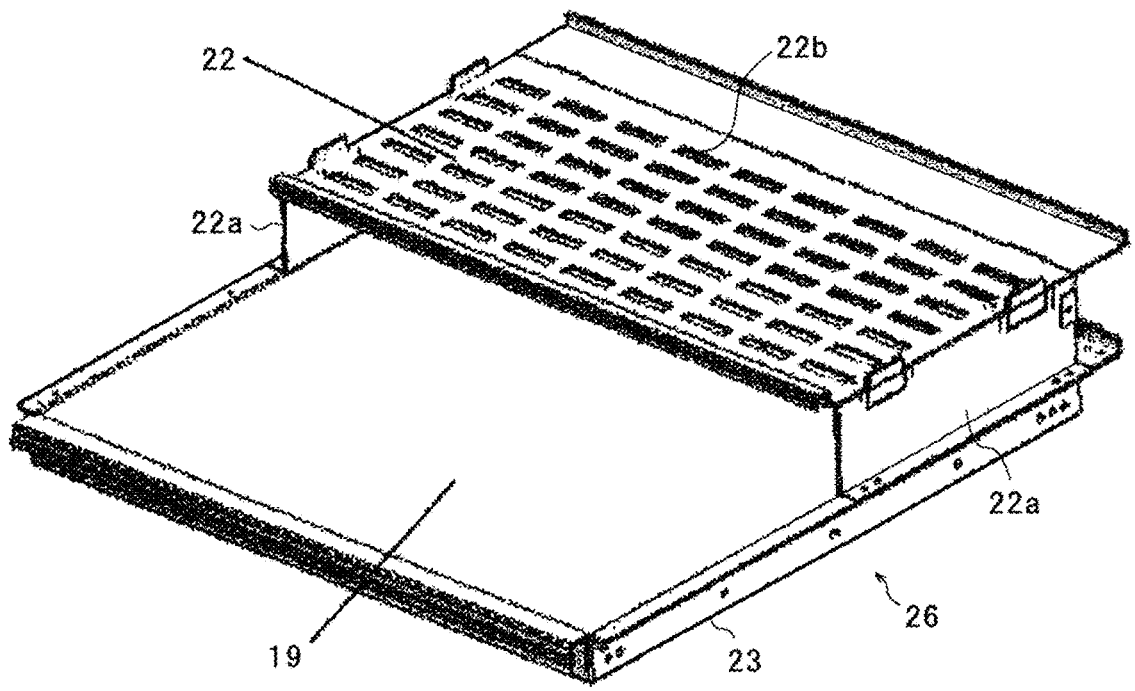
FIG. 4 is a schematic perspective view of a bottom plate and a partition according to an embodiment of the present disclosure.
Figure 5:
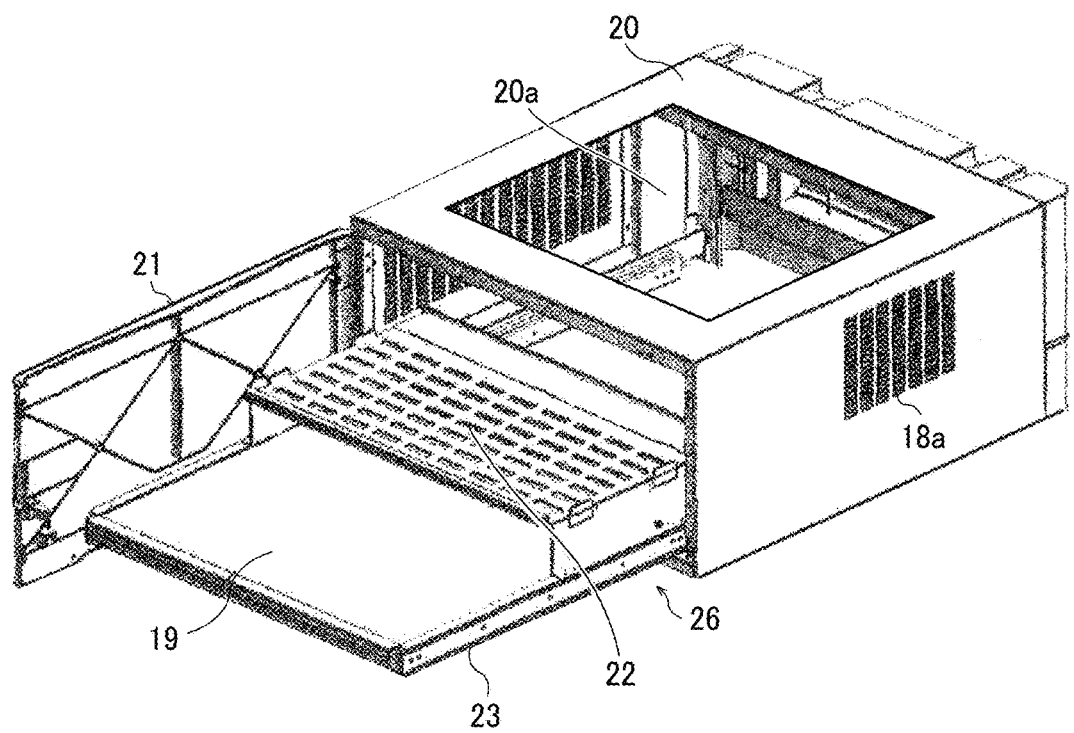
FIG. 5 is a schematic perspective view of a configuration of the network device housing according to an embodiment of the present disclosure.

The bottom plate 19 and the partition 22 illustrated in FIG. 4 are disposed inside the housing body 18. FIG. 5 illustrates a state in which the door 21 is opened and the bottom plate 19 and the partition 22 are drawn out from the housing body 18.

The bottom plate 19 can be drawn out with respect to the housing body 18 by rails 23 provided on both lateral sides of the housing body 18, and the electrical devices housed in the housing body 18 are placed on an upper side thereof. The partition 22 is attached to the bottom plate 19 to form an integral unit. The partition 22 includes legs 22a, which rise from both lateral sides of the bottom plate 19, on the both lateral sides of the partition 22, and vertically divides the space inside the housing body 18.

The bottom plate 19, the partition 22, and the rails 23 described above constitute a drawer 26 that can be drawn out from the housing body 18.

In addition, the partition 22 is formed such that the length of the partition 22 in the draw-out direction of the bottom plate 19, that is, the length of the housing 3 in a depth direction, is shorter than the length of the bottom plate 19 in the draw-out direction and is about half the length of the bottom plate 19 in the present embodiment. Accordingly, the partition 22 divides the space inside the housing body 18 also in the depth direction. A plurality of vents 22b to pass air and heat are formed on the partition 22 and the electrical devices accommodated in the housing body 18 are placed on an upper surface of the partition 22.

Figure 6:
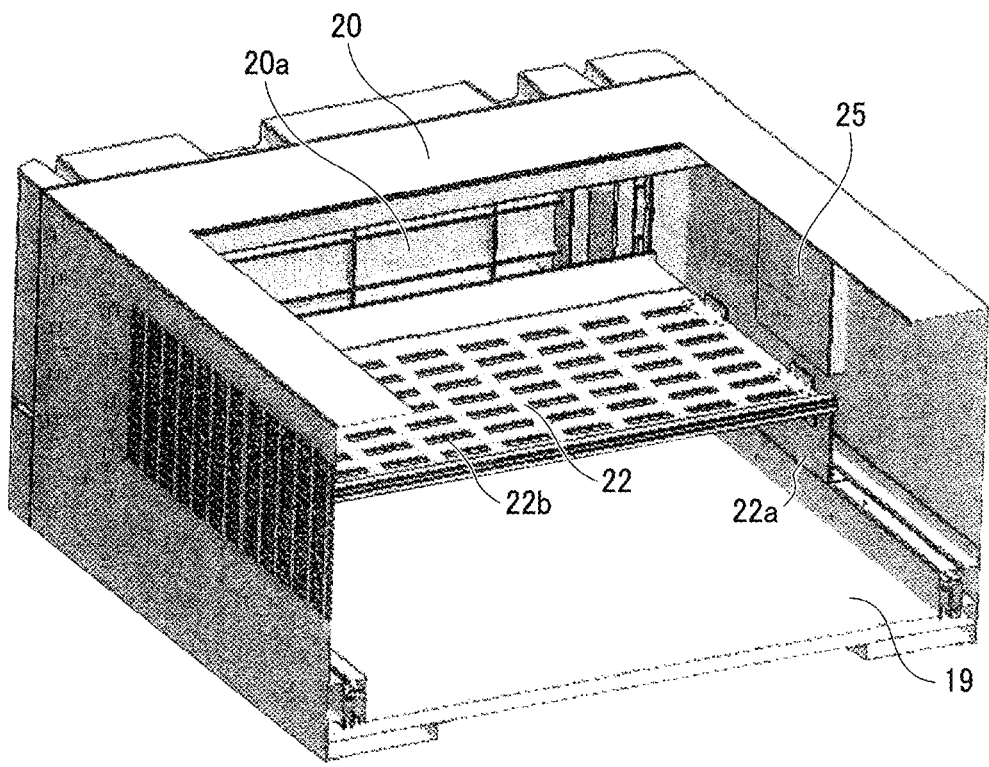
FIG. 6 is a schematic perspective view of a configuration of the network device housing according to an embodiment of the present disclosure.

As illustrated in FIG. 6, heat exhaust fans 25 as heat exhaustion members to forcibly exhaust air and heat in the housing body 18 from the exhaust ports 18a are disposed on inner lateral sides of the housing body 18 at positions corresponding to the exhaust ports 18a.

According to the above-described configuration of the present embodiment, both the bottom plate 19 and the partition 22, on which the electrical devices are placeable, can be drawn out from the housing body 18. Such a configuration can enhance workability when the devices are accommodated into or taken out from the housing body 18.

In addition, the electrical devices can be accommodated in a space between the bottom plate 19 and the partition 22, a space between the bottom plate 19 and the top plate 20, and a space between the partition 22 and the top plate 20. Thus, the ease of installation of the electrical devices can be enhanced, and devices that are large in the height direction can be accommodated.

The opening 20a formed in the top plate 20 allows accessing the electrical devices accommodated in the housing 3 from the upper side of the housing 3, in addition to accessing from the front side of the housing 3 by drawing out the bottom plate 19 and the partition 22. Such a configuration can enhance workability in accommodating into or taking out the electrical devices from the housing body 18. Further, when the apparatus body 2 and the housing 3 are separated from each other for maintenance or the like, the appearance and the state of the accommodated electrical devices can be checked without looking into the electrical devices from the front side and the visibility is improved. Thus, the appearance and the state of the accommodated electrical devices can be easily checked to perform subsequent work. As a result, workability can be enhanced.

In addition, the partition 22 is formed to have a shorter length in the draw-out direction than the bottom plate 19 and the partition 22 is disposed above a rear portion of the bottom plate 19 in the draw-out direction. Thus, the number and size of the electrical devices that can be accommodated are increased and workability can be enhanced.

Since the partition 22 has the plurality of vents 22b, heat and air generated from the electrical devices arranged on the bottom plate 19 can be released to an upper part of the housing 3, and the temperature rise in the housing body 18 can be restrained to prevent the adverse effect of the temperature rise on the electrical devices.

Further, since the housing body 18 includes the heat exhaust fans 25 to exhaust the internal heat outside of the housing body 18, the heat generated from the electrical devices on the partition 22 and the heat generated from the electrical devices on the bottom plate 19 and raised through the vents 22b can be exhausted outside of the housing body 18. Thus, the temperature rise in the housing body 18 is restrained to effectively prevent the adverse effect of the temperature rise on the electrical devices.

Further, the opening 20a exerts a heat radiation effect by an ascending air current with respect to the heat generated from the electrical devices, and the opening 20a functions as an intake to guide the air current to the heat exhaust fans 25. Thus, the cooling effect can be enhanced.

In the above-described embodiments and modifications, a full-color copying apparatus is described as an example of the image forming apparatus. However, the image forming apparatus is not limited to the full-color copying apparatus, and the present disclosure is also applicable to monochrome and color printers, facsimile machines, multifunction peripherals, and the like. Further, in the above-described embodiments and modifications, the sheet S is employed as an example of the recording medium on which an image is formed. However, the sheet S is not limited to an envelope or a wrapper, and may be any sheet-like material on which an image can be formed, including cardboard, postcards, envelopes, plain paper, thin paper, coated paper, art paper, tracing paper, overhead projector (OHP) sheets, OHP films, and resin films.

Some embodiments of the present disclosure have been described above. However, embodiments of the present disclosure are not limited to the above-described embodiments, and various modifications and changes can be made within a range of the gist of the present disclosure recited in the scope of claims. The advantages achieved by the embodiments described above are examples and therefore are not limited to those described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

What is claimed is:

1. An image forming apparatus comprising:
   an image forming device configured to form an image on a recording medium;
   a sheet feeder configured to store the recording medium and convey the recording medium toward the image forming device; and
   a housing, provided below all other components of the image forming device configured to form the image and configured to accommodate an electrical device in the housing, the electrical device being unrelated to the image forming device configured to form the image,
   the housing including:
      a housing body; and
      a drawer configured to be drawn out from the housing body,
      the drawer including:
         a bottom plate on which the electrical device is placeable and
         a partition above the bottom plate on which the electrical device is placeable.

2. The image forming apparatus according to claim 1, wherein a length of the partition in a draw-out direction of the drawer is shorter than a length of the bottom plate in the draw-out direction, and
   wherein the partition is disposed above a rear portion of the bottom plate in the draw-out direction.

3. The image forming apparatus according to claim 2, wherein the housing is configured to accommodate the electrical device both during operation and non-operation of the electrical device.

4. The image forming apparatus according to claim 3, wherein the housing includes at least one heat exhaustion member to exhaust heat generated from the electrical device during operation of the electrical device.

5. The image forming apparatus according to claim 4, wherein the at least one heat exhaustion member includes at least one heat exhaust fan to forcibly exhaust air and heat generated from the electrical device during operation of the electrical device.

6. The image forming apparatus according to claim 1, wherein the partition includes a plurality of vents.

7. The image forming apparatus according to claim 6, wherein the housing is configured to accommodate the electrical device both during operation and non-operation of the electrical device.

8. The image forming apparatus according to claim 7, wherein the housing includes at least one heat exhaustion member to exhaust heat generated from the electrical device during operation of the electrical device.

9. The image forming apparatus according to claim 8, wherein the at least one heat exhaustion member includes at least one heat exhaust fan to forcibly exhaust air and heat generated from the electrical device during operation of the electrical device.

10. The image forming apparatus according to claim 1, wherein the housing body includes a heat exhaustion member configured to exhaust internal heat outside of the housing body.

11. The image forming apparatus according to claim 1, wherein a top plate of the housing includes an opening having a size configured to allow the electrical device to be replaced.

12. The image forming apparatus according to claim 1, wherein the electrical device is a network device.

13. The image forming apparatus according to claim 12, wherein the housing is configured to accommodate the network device both during operation and non-operation of the network device.

14. The image forming apparatus according to claim 13, wherein the housing includes at least one heat exhaustion member to exhaust heat generated from the electrical device during operation of the electrical device.

15. The image forming apparatus according to claim 14, wherein the at least one heat exhaustion member includes at least one heat exhaust fan to forcibly exhaust air and heat generated from the electrical device during operation of the electrical device.

16. The image forming apparatus according to claim 1, wherein the housing is configured to accommodate the electrical device both during operation and non-operation of the electrical device.

17. The image forming apparatus according to claim 16, wherein the housing includes at least one heat exhaustion member to exhaust heat generated from the electrical device during operation of the electrical device.

18. The image forming apparatus according to claim 17, wherein the at least one heat exhaustion member includes at least one heat exhaust fan to forcibly exhaust air and heat generated from the electrical device during operation of the electrical device.

* * * * *